United States Patent [19]

Starke

[11] Patent Number: 4,742,961

[45] Date of Patent: May 10, 1988

[54] EXHAUST GAS NOZZLE INCLUDING A COOLING AIR DIVERTER

[75] Inventor: Roy R. Starke, Palm Beach Gardens, Fla.

[73] Assignee: United Technologies Corporation, Hartford, Conn.

[21] Appl. No.: 45,343

[22] Filed: May 4, 1987

[51] Int. Cl.$^4$ .................... B64D 33/04; B63H 11/117
[52] U.S. Cl. ........................... 239/127.1; 239/127.3; 239/265.29; 60/266
[58] Field of Search ............ 239/127.1, 127.3, 265.19, 239/265.29; 60/226.2, 266

[56] References Cited

U.S. PATENT DOCUMENTS

| | | | |
|---|---|---|---|
| 3,837,411 | 9/1974 | Nash et al. | 137/610 |
| 3,949,550 | 4/1976 | Albrecht et al. | 60/229 |
| 4,081,137 | 3/1978 | Sutton et al. | 239/127.3 |
| 4,098,076 | 7/1978 | Young et al. | 60/230 |
| 4,575,006 | 3/1986 | Madden | 239/265.29 |
| 4,643,356 | 2/1987 | Holler et al. | 239/127.3 X |

FOREIGN PATENT DOCUMENTS

| | | | |
|---|---|---|---|
| 86298 | 5/1977 | Australia | 239/127.3 |
| 2132279 | 7/1984 | United Kingdom | 239/127.3 |

*Primary Examiner*—Andres Kashnikow
*Assistant Examiner*—Mary Beth O. Jones

[57] ABSTRACT

A cooling air diverter (8) is responsive to exhaust nozzle configuration, directing cooling air (2) to a reverser vane isolation valve (9) during forward thrust operation, and to a conduit (10), which forms part of a reverser vane access passage (17), during reverse thrust operation. The cooling air diverter includes a pivotal arm assembly (18) with inner (22) and outer (23) flaps independently movable about a first common hinge (19), and a floating flap (24) pivotable about a second hinge (25) fastened at the outward end of the inner flap. Flap movement and position is determined by contact with the isolation valve, which moves in response to thrust redirection. By utilizing an existing movable nozzle member to actuate the diverter, directional control of the cooling airflow is achieved without requiring additional actuators or complex mechanical control devices, minimizing complexity and optimizing nozzle weight.

3 Claims, 3 Drawing Sheets

EXHAUST GAS NOZZLE INCLUDING A COOLING AIR DIVERTER

DESCRIPTION

This invention was made with Government support under a contract awarded by the Department of the Air Force. The Government has certain rights in this invention.

TECHNICAL FIELD

This invention relates to exhaust nozzles for gas turbine engines and more particularly to devices for directing cooling air between alternate nozzle members in response to nozzle configuration.

BACKGROUND ART

Two dimensional convergent/divergent variable area exhaust nozzles are combinable with a reverser vane system which includes a plurality of movable vanes to optimize engine operation in vertical takeoff and landing (VTOL) and short takeoff and landing (STOL) aircraft. In order to improve the life of the various members incorporated in the particular nozzle assembly, cooling air is usually directed internally to those parts in contact with the hot exhaust gas stream. The cooling air is obtained from the engine compressor section and ducted to the members to be cooled. Consequently, the quantity of cooling air required has an impact on engine efficiency. To opimize engine operation, variable flow or on/off type flow controllers are utilized which reduce or increase cooling airflow in response to nozzle configuration. For example, in U.S. Pat. No. 4,098,076 to Young, et al., a cooling air management system for a two-dimensional exhaust nozzle is disclosed which includes several valves with associated control mechanisms. Of course, the more complex the cooling system, the more weight is added to the nozzle assembly.

With two dimensional convergent/divergent vectoring nozzles, a reverser vane system is usually included which is isolated from the exhaust stream during the forward thrust configuration by an isolation valve. Since the isolation valve is in contact with the exhaust gas stream, cooling is utilized to extend its operational life. During the transition from forward to reverse thrust, the isolation valve unports and allows the exhaust stream to enter a reverser vane access passage, providing access to the reverser vane system. Consequently, during reverse thrust operation, cooling air is more properly directed to the walls of the reverser vane access passage. Since cooling air is required for the reverser vane system, but not for the isolation valve, diverter means may be utilized for directing cooling flow from the isolation valve during forward thrust operation to the reverser vane system during reverse thrust operation. Such diverter means must be capable of maximizing cooling efficiency and optimizing engine operation while minimizing nozzle complexity and weight.

DISCLOSURE OF INVENTION

According to the present invention, an exhaust nozzle for an aircraft gas turbine engine includes a supply duct for receiving cooling air, the supply duct including a first static seal and a second static seal oppositely disposed therein, a first member movable in response to thrust redirection, including a cooling air passage therein, conduit means communicating the duct with a second member, for occasionally directing cooling air thereto, and a diverter for selectively directing the cooling air to either the first member or the second member in response to the position of said first member.

In one embodiment of the present invention, the diverter comprises a pivotally movable arm having an outer flap, an inner flap and a pivotally mounted floating flap disposed therebetween. The inner and outer flaps are independently pivotable about a common hinge, with the floating flap pivotable about a second hinge fastened at an outward end of the inner flap. The inner flap also includes a lug which extends through a lug access hole in the outer flap. The lug is engageable by the first member, for driving the inner flap into contact with the first seal. The outer flap is similarly movable into contact with the second seal in response to contact with the first member. The floating flap slidably engages the outer flap for preventing cooling air leakage through the lug access hole during flap movement.

BEST MODE FOR CARRYING OUT THE INVENTION

For exemplary purposes, a two-dimensional exhaust nozzle is discussed which may typically be found in a gas turbine engine powered aircraft. Such a nozzle includes static rectangular sidewalls with movable oppositely disposed rectangular flaps located therebetween. While various actuation devices and other structures are also included in the nozzle, for simplicity, the non-critical components will not be discussed in detail. Suffice it to say that an exhaust nozzle for a gas turbine powered aircraft includes both movable and static members occasionally in contact with a hot exhaust gas stream, which require cooling to operate efficiently.

Figure 1:
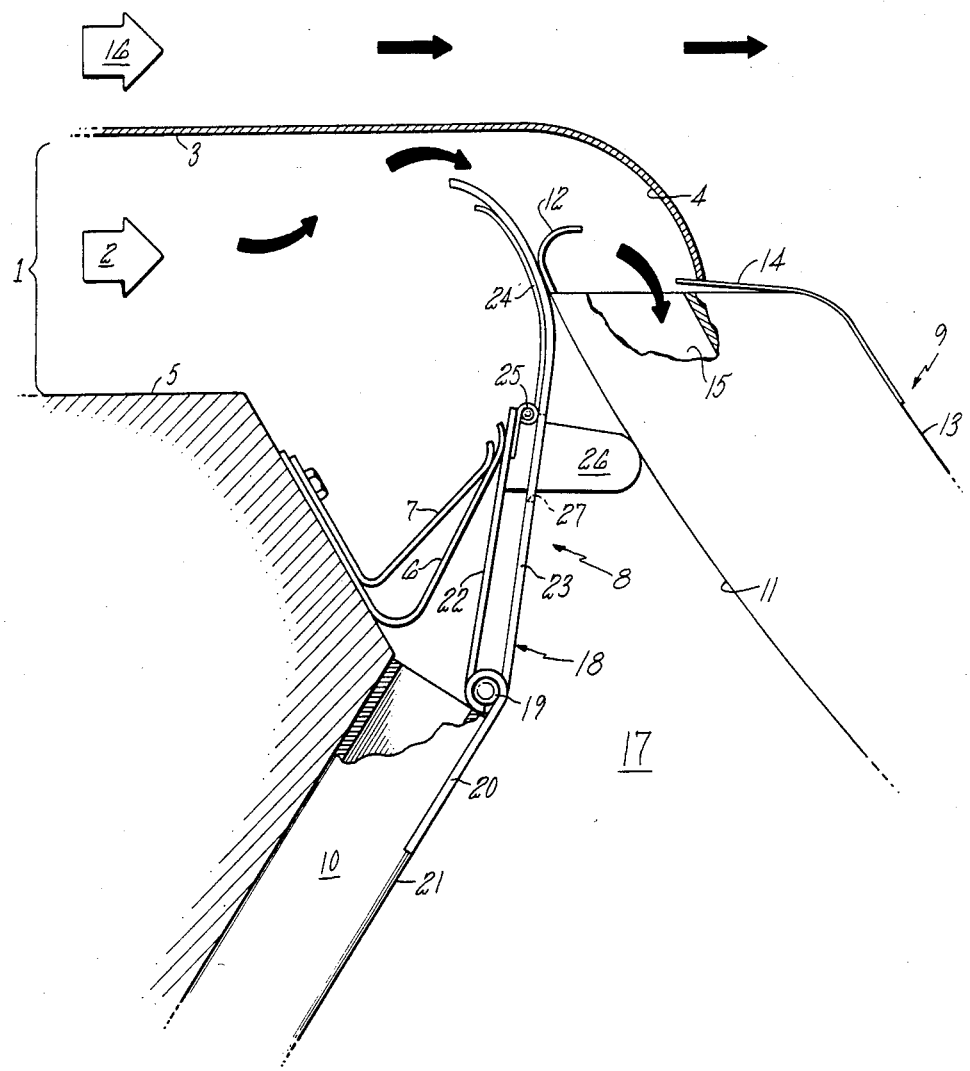
FIG. 1 shows the diverter valve of the present invention diverting cooling air to a movable member during forward thrust operation.

Referring to FIG. 1, an exhaust nozzle (not shown) includes a cooling air supply duct 1 through which cooling air 2 flows. Generally, the cooling air is ducted from the compressor section of a gas turbine engine, providing a ready source of pressurized, relatively cool air. The duct 1 is essentially rectangular and has an outer wall 3 with a shoulder 4 and an inner wall 5. An inner static seal 6 is mounted on the inner wall 5 and includes a spring damper 7 for preventing vibrations from causing seal chatter. A flow diverter 8, positioned in the duct 1, selectively directs the cooling air 2 to either a first member 9 or a conduit 10. For illustrative purposes, the first member 9 comprises an isolation valve which includes a cam wall 11 with a guide nose 12, and an arcuate wall 13 with an outward seal end 14. A cooling passage 15 conducts the cooling air through the isolation valve 9. A hot exhaust stream 16 passes over the duct outer wall 3 and the isolation valve arcuate wall 13 during forward thrust operation. The isolation valve prevents the hot exhaust stream from entering a reverser vane access passage 17.

Referring still to FIG. 1, the diverter 8 includes an arm assembly 18 which is pivotable about a first hinge 19 fixed by a base 20 to an access passage sidewall 21. For illustrative purposes, the sidewall 21 forms part of the conduit 10, providing a boundary between the hot and cool gas streams. The arm assembly 18 includes an inner essentially rectangular flap 22, an outer essentially rectangular flap 23 and a floating flap 24, which pivots about a second hinge 25. The inner and outer flaps 22 and 23 are independently pivotable about the hinge 19 and, therefore, are selectively contactable with either the inner static seal 6 or the shoulder 4. A lug 26 is fixedly attached to the inner flap 22 and projects through a lug access hole 27 in the outer flap 23 to engage the cam wall 11. While only a single lug is described, it will be understood by those skilled in the art that a plurality of lugs may also be used.

Figure 2:
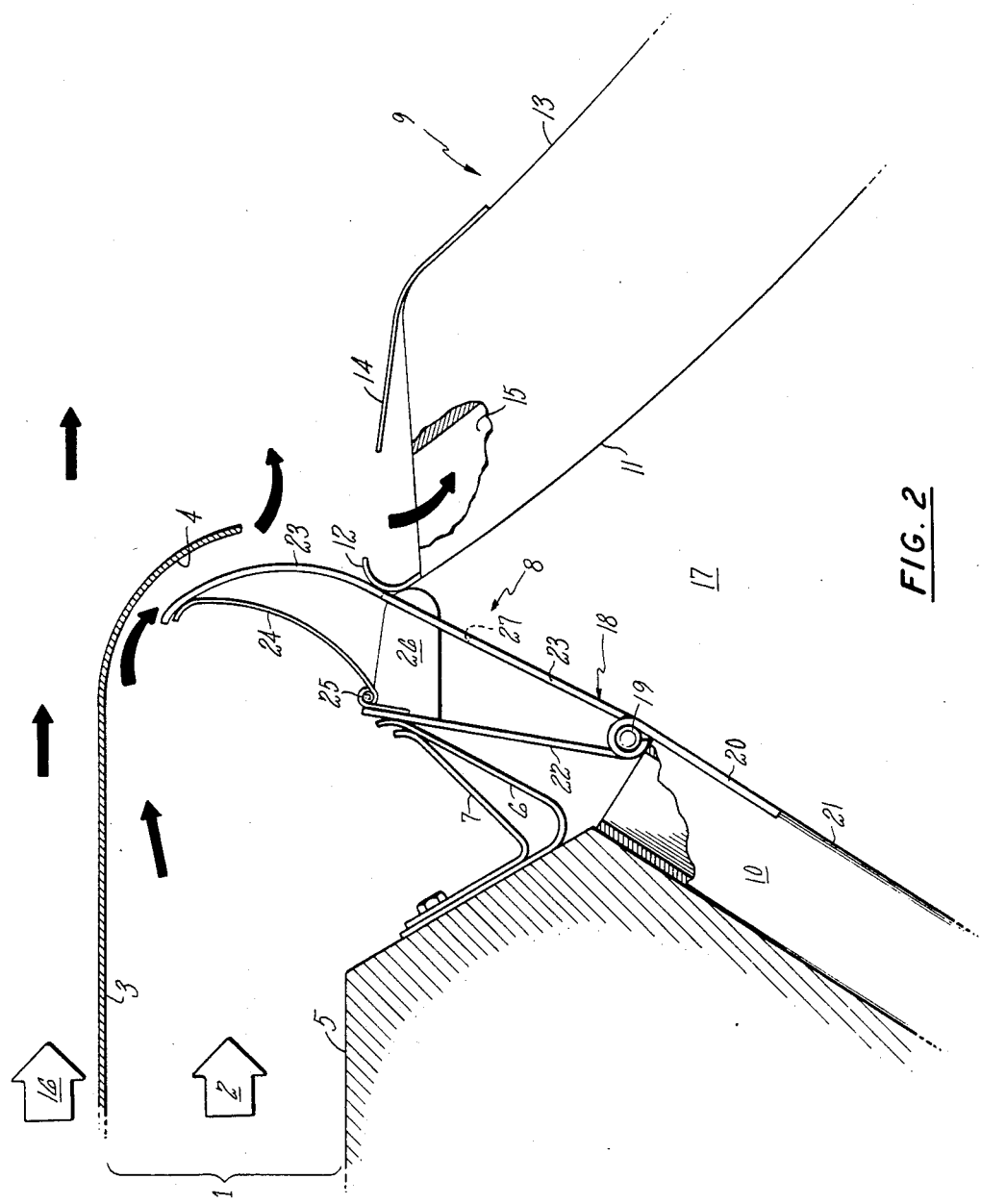
FIG. 2 shows the diverter valve during the transition from forward to reverse thrust operation.
Figure 3:
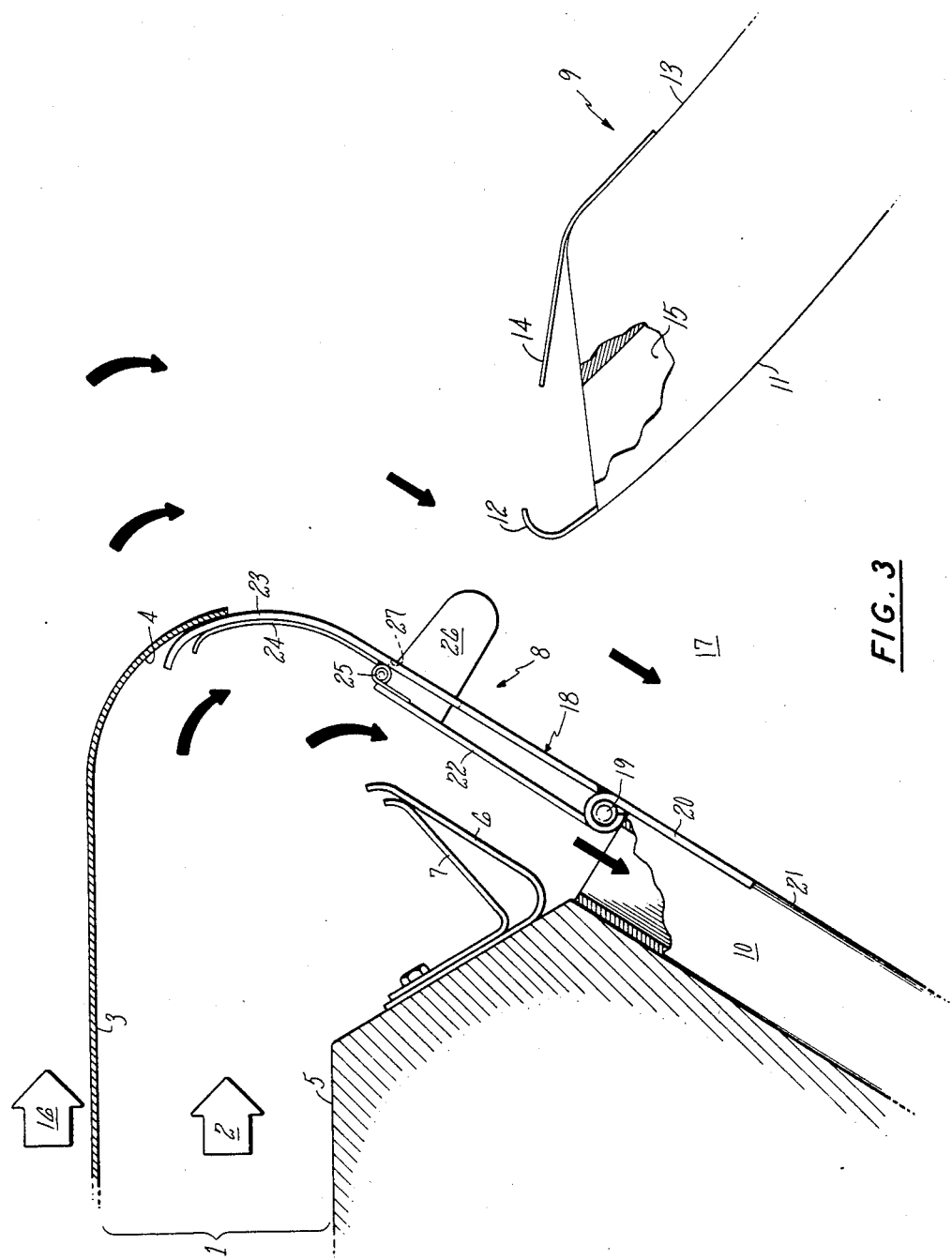
FIG. 3 shows the diverter valve during reverse thrust operation.

Referring to FIGS. 1, 2 and 3, a typical operating sequence is shown for an embodiment of the cooling air diverter of the present invention. Referring to FIG. 1, cooling air is shown entering the cooling air duct 1. During conventional forward thrust operation, the reverser vane system is isolated by the isolation valve 9 from the hot exhaust gas stream 16. Consequently, cooling air is diverted into the isolation valve cooling passage 15 to prevent thermal fatigue and extend its useful life. With the isolation valve in the blocking position, the outward seal end 14 is sealingly engaged with the shoulder 4. The guide nose 12 engages the outer flap 23, allowing cooling air to be admitted to the passage 15. The outward seal end 14 engages the shoulder 4 to prevent exhaust gas from entering the cooling passage 15. The cam wall 11 simultaneously engages the lug 26 to drive the inner flap 22 into sealing engagement with the static seal 6, blocking the cooling flow from entering the conduit 10. Cooling air is thereby directed by the diverter 8 through the cooling passage 15, with the conduit 10 positively sealed.

Referring to FIG. 2, the diverter is shown in an intermediate stage of thrust transition. As the exhaust nozzle configuration is changed to effect reverser actuation, the isolation valve 9 begins to withdraw, retracting the guide nose 12. The outer flap 23 then correspondingly approaches the shoulder 4, reducing cooling flow to passage 15. However, lug 26, still engaged by the cam wall 11, prevents the disengagement of the inner flap 22 from the inner static seal 6. As the outer flap 23 withdraws, the floating flap 24 pivots about the hinge 25 and seals the gap between the inner and outer flaps, slidably engaging the outer flap 23, and thereby preventing cooling air from escaping through the lug access hole 27. For illustrative purposes, a portion of the cooling air is allowed to escape into the exhaust gas stream during the transition period.

Referring to FIG. 3, the nozzle is shown in the reverse thrust configuration. With the isolation valve completely disengaged from the diverter 8, the outer flap 23 mates with the shoulder 4, blocking airflow therethrough. Similarly, with the isolation valve retracted, the lug 26 disengages from the cam wall 11, allowing the inner flap 22 to disengage from the inner static seal 6, while the floating flap 24 seats against the outer flap 23. Cooling air is thereby diverted through the conduit 10. It should be noted that the cooling air provides sufficient pressure loading of the inner, outer and floating flaps to prevent valve flutter or gas leakage and that during the reciprocal transition from reverse to forward thrust operation, the above-described sequence is reversed, with the diverter selectively redirecting the flow of cooling air from the conduit 10 to the isolation valve cooling passage 15.

The diverter of the present invention provides simple and reliable cooling air directional control, automatically responding to changes in nozzle configuration without requiring additional actuation devices. Optimum cooling efficiency is achieved without adding to nozzle weight or increasing nozzle complexity. While this invention has been described in relation to a diverter for selectively alternating cooling airflow between a conduit and an isolation valve, it will be understood by those skilled in the art that such a diverter could be located in other areas of an exhaust nozzle to selectively divert cooling air between ocassionally heated members in response to nozzle configuration.

It should be understood that the invention is not limited to the particular embodiments shown and described herein, but that various changes and modifications may be made without departing from the spirit and scope of this novel concept as defined by the following claims.

Having thus described the invention, what is claimed is:

1. An exhaust gas nozzle for an aircraft gas turbine engine which includes a supply duct for receiving cooling air, said supply duct including a first static seal and a second static seal; a first member movable in response to thrust redirection, including a cooling air passage therein, conduit means connected to said duct, for occasionally directing cooling air thereto, and diverter means for selectively directing said cooling air to either said first member or to said conduit means in response to the position of said first member, said diverter means comprising: a pivotally movable arm assembly having an outer flap, an inner flap and a pivotally mounted floating flap disposed therebetween, said inner and outer flaps independently pivotable about a common hinge with said floating flap pivotable about a second hinge fastened at an outward end of said inner flap, said inner flap including a lug which extends through a lug access hole in said outer flap, said lug being contactable by said first member for moving said inner flap into engagement with, said first seal, said outer flap being movable out of engagement with said second seal in response to contact with said first member, said floating flap being slidably engageable with said outer flap for preventing cooling air leakage through said lug access hole during movement of said flaps.

2. The exhaust gas nozzle of claim 1 wherein said first movable member comprises a reverser isolation valve.

3. The exhaust gas nozzle of claim 1 wherein said inner, outer and floating flaps are pressure loaded by said cooling air.

* * * * *